US011843703B2

(12) United States Patent
Venkatesh et al.

(10) Patent No.: US 11,843,703 B2
(45) Date of Patent: Dec. 12, 2023

(54) BLOCKCHAIN-BASED DISTRIBUTED LEDGERS FOR IMAGE FORMING APPARATUSES

(71) Applicant: Hewlett-Packard Development Company, L.P., Spring, TX (US)

(72) Inventors: Ranjeetha Venkatesh, Bangalore (IN); Sudhindra Venkatesh Kulkarni, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 128 days.

(21) Appl. No.: 17/418,527

(22) PCT Filed: Jul. 17, 2019

(86) PCT No.: PCT/US2019/042102
§ 371 (c)(1),
(2) Date: Jun. 25, 2021

(87) PCT Pub. No.: WO2021/010991
PCT Pub. Date: Jan. 21, 2021

(65) Prior Publication Data
US 2022/0131705 A1 Apr. 28, 2022

(51) Int. Cl.
*G06F 21/60* (2013.01)
*H04L 9/32* (2006.01)
*G06F 21/64* (2013.01)
*H04L 9/00* (2022.01)

(52) U.S. Cl.
CPC .......... *H04L 9/3247* (2013.01); *G06F 21/608* (2013.01); *G06F 21/64* (2013.01); *H04L 9/50* (2022.05)

(58) Field of Classification Search
CPC ....... H04L 9/3247; H04L 9/50; G06F 21/608; G06F 21/64; G06F 3/1203; G06F 3/1231; G06F 3/1287; G06F 3/1288; G06F 21/60
See application file for complete search history.

(56) References Cited

U.S. PATENT DOCUMENTS

| 10,063,529 | B2 | 8/2018 | Milazzo et al. |
| 10,250,395 | B1 | 4/2019 | Borne-Pones et al. |
| 2008/0064396 | A1 | 3/2008 | Igoe |
| 2016/0260169 | A1 | 9/2016 | Arnold et al. |
| 2016/0283920 | A1 | 9/2016 | Fisher et al. |
| 2017/0046664 | A1 | 2/2017 | Haldenby et al. |

(Continued)

FOREIGN PATENT DOCUMENTS

WO WO-2018190809 A1 10/2018

*Primary Examiner* — Quazi Farooqui
(74) *Attorney, Agent, or Firm* — QUARLES & BRADY LLP

(57) ABSTRACT

In one example, a cloud printing server may include a processor and a memory coupled to the processor. The memory may include a blockchain management component to register an image forming apparatus with a blockchain associated with multiple entities of a blockchain network, create a distributed ledger relating to the blockchain, create a ledger entry including information indicating operational state and configuration data of the image forming apparatus in the distributed ledger, and transmit an instance of the distributed ledger to the multiple entities including the image forming apparatus.

15 Claims, 10 Drawing Sheets

(56) References Cited

U.S. PATENT DOCUMENTS

| | | |
|---|---|---|
| 2018/0094953 A1 | 4/2018 | Colson et al. |
| 2018/0173203 A1 | 6/2018 | Freer et al. |
| 2018/0257306 A1 | 9/2018 | Mattingly et al. |
| 2019/0065681 A1* | 2/2019 | Gmeiner ................ G16H 40/20 |
| 2019/0101896 A1 | 4/2019 | Cantrell et al. |
| 2020/0027080 A1* | 1/2020 | Holland .................... H04L 9/50 |
| 2020/0301400 A1* | 9/2020 | Heinrich ............ G06Q 10/0833 |

* cited by examiner

BLOCKCHAIN-BASED DISTRIBUTED LEDGERS FOR IMAGE FORMING APPARATUSES

BACKGROUND

Recently, cloud applications have seen tremendous growth as Internet connections improve with respect to availability and speed. Image forming apparatuses such as printers, scanners, photocopiers, and multifunctional devices may be equipped with a communication function, and thus, a cloud service can be made available to the image forming apparatuses through communication with a cloud printing server. Image forming apparatuses may support the cloud services such as subscription ink supply services, scanning to a cloud storage device or local storage device, optical character recognition, and remote printing, for example. In the example of remote printing, a cloud printing server may provide an ability for any application running on any device within a network to communicate with a cloud print service, to thereby print to any image forming apparatus that is also in communication with the cloud print service. For example, an application may send a print request, over a network, to the cloud printing server for printing a document using the cloud print service.

BRIEF DESCRIPTION OF THE DRAWINGS

Examples are described in the following detailed description and in reference to the drawings, in which.

DETAILED DESCRIPTION

Figure 1A:
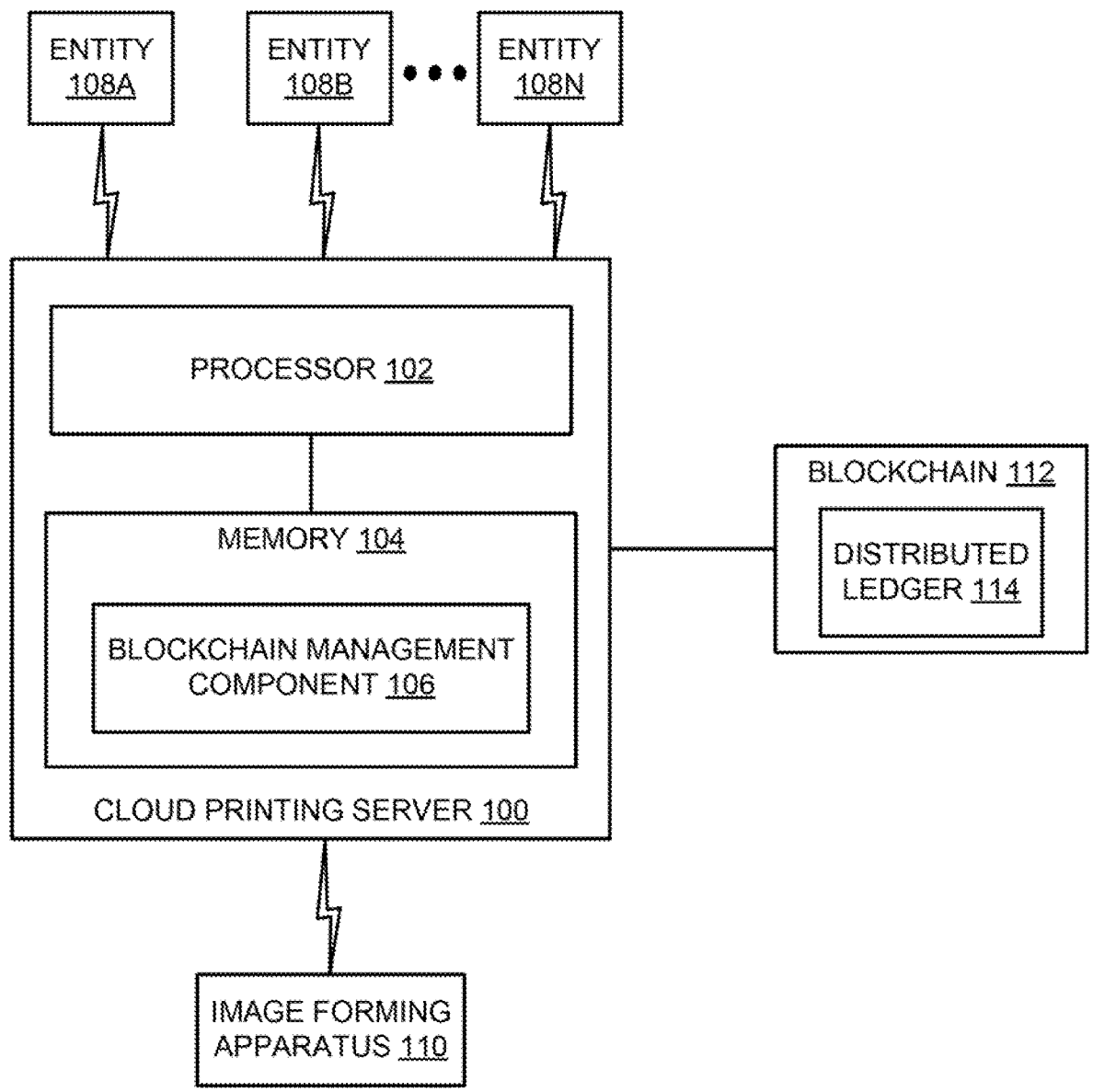
FIG. 1A is a block diagram of an example cloud printing server, including a blockchain management component to create and share a distributed ledger including operational state and configuration data of an image forming apparatus.

Image forming apparatuses may provide support for cloud services, which may interface and interact with remote resources, such as via the internet or in a cloud environment. The image forming apparatuses may need to activate or access the cloud services, for instance, over the internet or a cloud connection. In order to use the cloud services, the image forming apparatuses may be registered to a cloud printing server. The image forming apparatuses and associated cloud services may exchange data via establishing trust with each other and then transact a specific business functionality. The Image forming apparatuses and the cloud services may become assertive parties to various management applications. The management applications may manage cloud services and image forming apparatuses to establish trust and exchange data among each other. In some examples, the cloud services may connect to the image forming apparatuses via a centralized architecture, where a cloud printing server, which manages requests for printing from individual sites and users, is based in a central location.

However, the centralized architecture may have challenges to manage a single point of failure, to manage multiple and redundant requests while a cloud service establishes trust and share the data across, and to consolidate the transactions for telemetry metrics and analysis.

Some example methods may provide cloud print platforms that provide services to enable the image forming apparatuses to register to a cloud, help the cloud to connect to the cloud services, and ensure connectivity of the cloud services with the image forming apparatuses. The cloud services may establish trust with help of security solutions (e.g., Web Authentication (WebAuth), HPID, or the like). A trust may be established between an image forming apparatus and a cloud print platform. For example, Web Authentication may be an authorization service to help the cloud services to establish trust with the cloud print platform. On other end, authentication services, such as HPID, may be used by a cloud service (e.g., a remote printing service) to establish trust with other cloud services (e.g., a security service or a fleet management service). While a cloud service, such as the remote printing service, may want to associate to an image forming apparatus, the trust needs to be established between the image forming apparatus and the cloud print platform, the cloud print platform and the cloud service, the image forming apparatus and the cloud service, and the cloud service to any other cloud service on-boarded within a system, thus making the system complex. The complexity broadens with additional cloud services coming into the system.

On the other hand, while the cloud services and the image forming apparatuses across the system perform multiple transactions post establishing the trust, transaction states and data gets managed at individual cloud services. This data can be exchanged across the cloud services, and shared to a telemetry system for metrics collection and data analysis. The consolidation of the data again may become complex as the source of the data is at individual cloud services. Thus, the cloud print platforms may become complex due to:

Redundant requests and channels to establish the trust.
    Prominence of single point of failure in such cloud print platforms.
    Complexity of the configuration, management, and maintenance of the cloud services.
    Consolidation of data from various cloud services for the telemetry system.

Examples described herein may provide a decentralized architecture that uses a blockchain technology to seamlessly integrate image forming apparatuses to cloud services. The decentralized architecture may securely communicate and maintain a distributed ledger of information selected from a group consisting of state and configuration data of the image forming apparatuses and the cloud services, transaction data between the image forming apparatuses and the cloud services, user profiles, and mapping information between the user profiles, the image forming apparatuses, and the cloud services. Thus, the distributed ledger that records transactions between two entities (e.g., image forming apparatuses, print services, or a combination thereof) in a permanent way can be maintained without involving integration of any third-party solutions.

Further, each entity participating in the blockchain may maintain a copy of the entire blockchain, although in some examples, entities may maintain portions of the blockchain. Maintaining the blockchain in multiple entities can provide a number of benefits. For example, as the blockchain is distributed, there is no single point of failure for the information in the blockchain, as compared with, for example, a centralized architecture.

In one example, the cloud printing server may register an image forming apparatus and a cloud service with a blockchain associated with multiple entities of a blockchain network. Further, the cloud printing server may generate mapping information to associate a user profile with the image forming apparatus and the cloud service. Furthermore, the cloud printing server may create a distributed ledger relating to the blockchain and generate a ledger entry corresponding to the image forming apparatus in the distributed ledger based on the mapping information. The ledger entry may include state and configuration information of the image forming apparatus and the cloud service, the mapping information, and/or data transaction between the image forming apparatus and the cloud service. Furthermore, the cloud printing server may transmit/share the distributed ledger to the multiple entities of the blockchain network including the image forming apparatus and the cloud service.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in that one example, but not necessarily in other examples.

Turning now to the figures, FIG. 1A is a block diagram of an example cloud printing server 100, including a blockchain management component 106 to create and share a distributed ledger 114 including operational state and configuration data of an image forming apparatus 110. Cloud printing server 100 may be any computing device accessible to a plurality of image forming apparatuses over the Internet. Example image forming apparatus 110 may include a printer, a scanner, a photocopier, a multifunctional device, or the like. For example, image forming apparatus 110 may provide services such as email printing services, downloadable printing apps usable for printing content from the Internet, scan-based services (e.g., scan2email service), cloud registration and management services, and/or the like.

As shown in FIG. 1A, cloud printing server 100 may include a processor 102 and a memory 104 coupled to processor 102. Further, memory 104 may include blockchain management component 106. In one example, blockchain management component 106 may be implemented in hardware, machine-readable instructions, or a combination thereof. Blockchain management component 106 may be implemented as engines or modules comprising any combination of hardware and programming to implement the functionalities described herein. In other examples, blockchain management component 106 can be implemented with a microcontroller, an application-specific integrated circuit (ASIC), a programmable gate array (PGA), or any other type of hardware component.

During operation, blockchain management component 106 may register image forming apparatus 110 with a blockchain 112 associated with multiple entities 108A-108N of a blockchain network. The term "blockchain" may refer to a process by which distributed ledgers can be created and operated. Blockchain 112 may be a transaction database shared by some or all entities participating in the blockchain network. Such participation may be based on the Bitcoin protocol, Ethereum protocol, and/or other protocols related to digital currencies, blockchains and/or the distributed ledgers. Blockchain 112 may be associated with a plurality of entities 108A-108N. Example entities 108A-108N may include image forming apparatuses, cloud services, or a combinations thereof. In one example, blockchain management component 106 may register image forming apparatus 110 with blockchain 112 using an identifier and a signed key during powering on of image forming apparatus 110.

Further, blockchain management component 106 may create distributed ledger 114 relating to blockchain 112. Furthermore, blockchain management component 106 may create a ledger entry including information indicating operational state and configuration data of image forming apparatus 110 in distributed ledger 114. In one example, blockchain management component 106 may create the ledger entry including the information indicating the operational state and configuration data of image forming apparatus 110 in distributed ledger 114 via a blockchain verification process. Example blockchain verification process may utilize a public-private key pair to authenticate image forming apparatus 110.

For example, image forming apparatus 110 may include multiple operational states, such as a printing forbidden state, error state, normal printing allowed state, normal printing not entered state, printing entered state, printing in progress state, printing finished state, printing abnormally completed state, printing normally completed state, or the like. Example configuration data of image forming apparatus 110 may include supporting services such as double-sided printing function, a paper feed cassette, a device model, a box storage function, a PDF printing function, user settings, and the like.

Further, blockchain management component 106 may transmit an instance of distributed ledger 114 to multiple entities 108A-108N including image forming apparatus 110. Distributed ledger 114 may be a database or replicas of a database that are shared and synchronized across a distributed network or networks. Each entity's copy of distributed ledger 114 may be identical to every other entity's copy. Further, distributed ledger 114 may allow transactions to be publicly or privately viewable and replicated, and thus making a cyberattack difficult.

In one example, multiple entities 108A-108N may look into a corresponding distributed ledger (e.g., stored locally) to determine print capabilities of image forming apparatus 110 and then control an operation of image forming apparatus 110, for instance, submitting a print job to image forming apparatus 110. Further, distributed ledger 114 may record the transactions that take place on the blockchain network and associated with image forming apparatus 110 as explained in FIG. 1B.

Figure 1B:
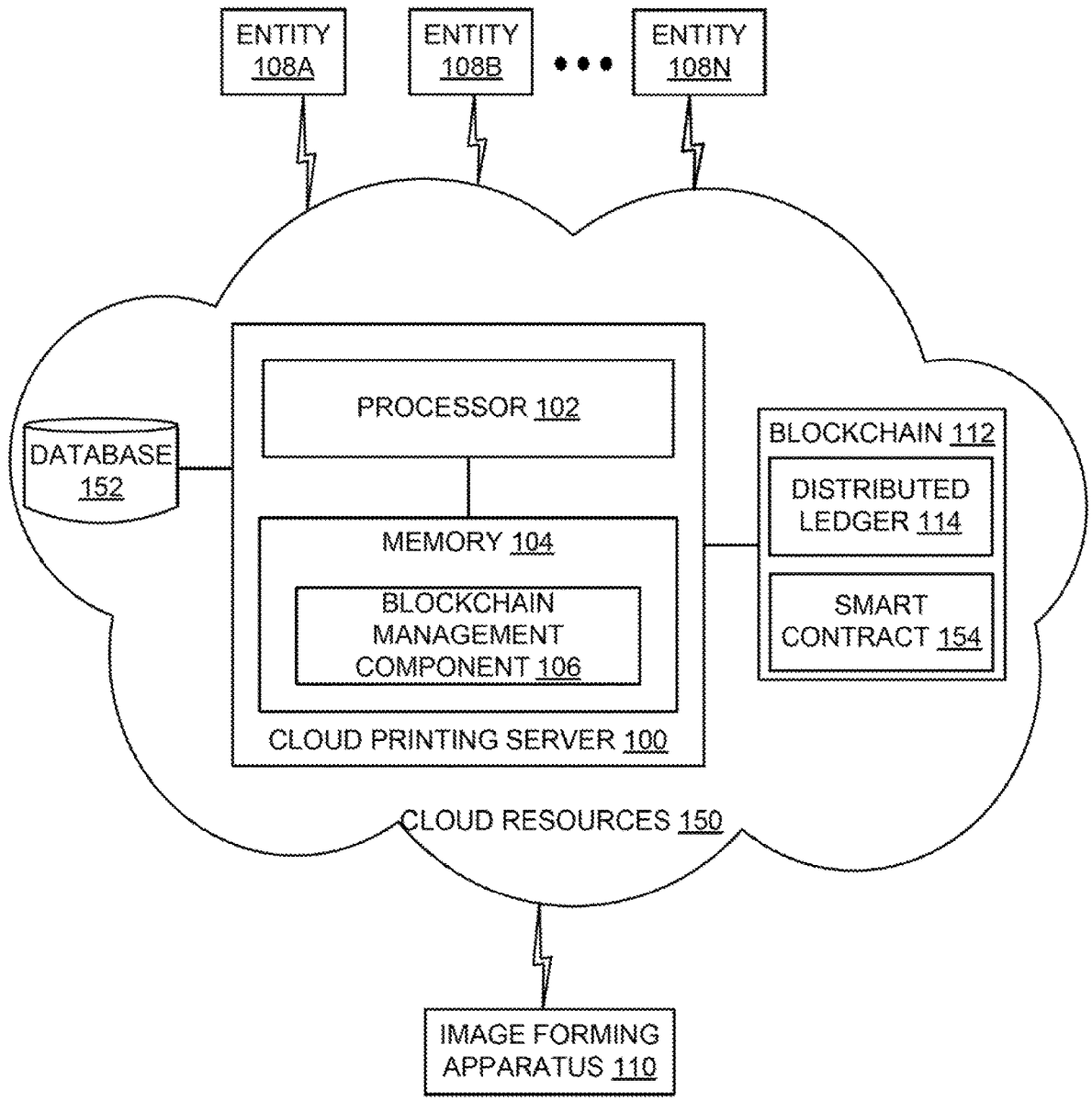
FIG. 1B is a block diagram of the example cloud printing server of FIG. 1A, depicting additional features.

FIG. 1B is a block diagram of example cloud printing server 100 of FIG. 1A, depicting additional features. For example, similarly named elements of FIG. 1B may be similar in structure and/or function to elements described with respect to FIG. 1A. As shown in FIG. 1B, cloud printing server 100 may be implemented using cloud resources 150 such as computing resources (e.g., processing resources, memory resources, and the like), storage resources, network resources, and/or the like.

During operation, blockchain management component 106 may trigger a smart contract 154 within blockchain 112 upon receiving a record of a data transaction associated with image forming apparatus 110. Blockchain 112 can be thought of as a shared, replicated transaction system which can be updated via smart contract 154 and kept consistently synchronized through a collaborative process called consensus. The blockchain network may use smart contract 154 to provide controlled access to distributed ledger 114. Further, blockchain management component 106 may validate, via smart contract 154, image forming apparatus 110. Furthermore, blockchain management component 106 may create a ledger entry associated with the record of the data transaction upon successful validation. Then, blockchain management component 106 may update distributed ledger 114 associated with multiple entities 108A-108N and image forming apparatus 110 to append the ledger entry associated with the record of the data transaction.

Further, cloud printing server 100 may include a database 152 to store metadata associated with multiple entities 108A-108N including image forming apparatus 110 of the blockchain network for telemetry metrics and analysis. In one example, the metadata may include data selected from a group consisting of a type of each of entities 108A-108N and 110, a capability of each of entities 108A-108N and 110, a scope of a transaction associated with each of entities 108A-108N and 110, and the like.

Thus, blockchain 112 may include distributed ledger 114 that chronologically stores transactions associated with image forming apparatus 110. In distributed ledger 114, the transactions may be periodically verified and stored in a "block" that is linked to a preceding block via a cryptographic hash. Each entity 108A-108N and 110 can receive and maintain a copy of distributed ledger 114. Further, public or private blockchains may be used in the blockchain network.

Figure 2A:
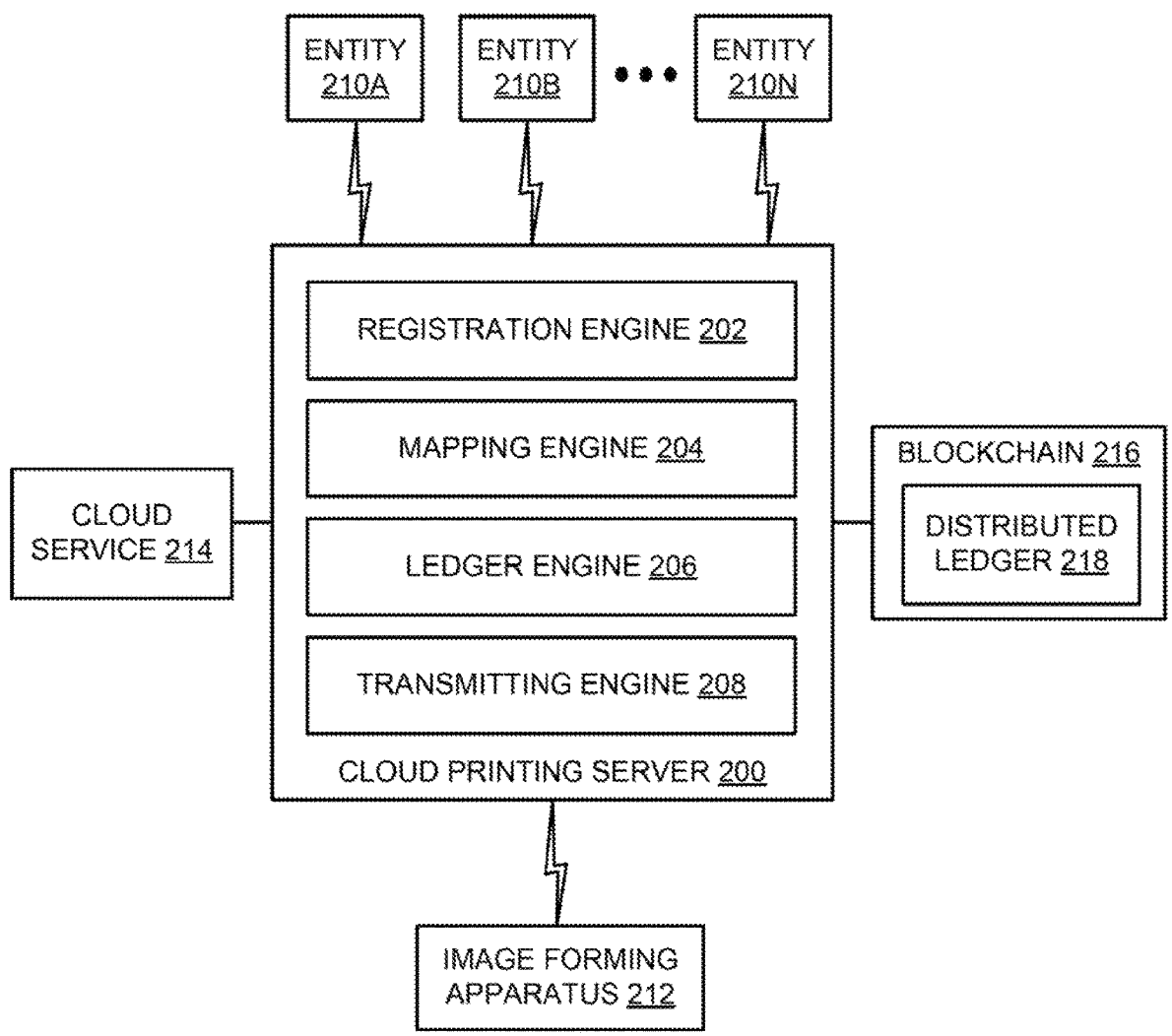
FIG. 2A is a block diagram of an example cloud printing server, including a ledger engine to create and share a distributed ledger including state and configuration information, user profiles, and mapping information of an image forming apparatus and a cloud service.

FIG. 2A is a block diagram of an example cloud printing server 200, including a ledger engine 206 to create and share a distributed ledger 218 including state and configuration information, user profiles, and mapping information of an image forming apparatus 212 and a cloud service 214. Example cloud service 214 may include a subscription ink supply service, scanning to a cloud storage device or local storage device, optical character recognition, remote printing, product registration, fleet management, or the like.

In one example, cloud printing server 200 may include a registration engine 202, a mapping engine 204, a ledger engine 206, and a transmitting engine 208 that are communicative with each other to create and share distributed ledger 218. Registration engine 202, mapping engine 204, ledger engine 206, and transmitting engine 208 may be implemented in hardware, machine-readable instructions, or a combination thereof. Registration engine 202, mapping engine 204, ledger engine 206, and transmitting engine 208 may be implemented as engines or modules comprising any combination of hardware and programming to implement the functionalities described herein. For example, registration engine 202, mapping engine 204, ledger engine 206, and transmitting engine 208 can be implemented with a microcontroller, an application-specific integrated circuit (ASIC), a programmable gate array (PGA), or any other type of hardware component.

During operation, registration engine 202 may register image forming apparatus 212 and cloud service 214 with a blockchain 216 associated with multiple entities 210A-210N of a blockchain network. Example entities 210A-210N may include image forming apparatuses, cloud services, or a combination thereof. Upon successful registering, image forming apparatus 212 and cloud service 214 may be referred to as entities of the blockchain network.

Further, mapping engine 204 may generate mapping information to associate a user profile with image forming apparatus 212 and cloud service 214. For example, the mapping information may include entitlement information indicating that cloud service 214 is allowed to use image forming apparatus 212.

Furthermore, ledger engine 206 may create distributed ledger 218 relating to blockchain 216. Further, ledger engine 206 may generate a ledger entry corresponding to image forming apparatus 212 in distributed ledger 218 based on the mapping information. In one example, the ledger entry may include state and configuration information of image forming apparatus 212 and cloud service 214, the user profile, and the mapping information.

Also, transmitting engine 208 may transmit distributed ledger 218 to multiple entities 210A-210N of the blockchain network including image forming apparatus 212 and cloud service 214. In one example, cloud printing server 200 may manage an operation of image forming apparatus 212 using transmitted distributed ledger 218.

For example, entity 210A, such as a cloud service, may look into a corresponding distributed ledger (e.g., stored locally) to determine print capabilities of image forming apparatus 212 and then control an operation of image forming apparatus 212, for instance, to submit a print job to image forming apparatus 212. In another example, entity 2103 may determine whether a cloud service is enabled on a printer or not using distributed ledger 218 stored in entity 2108. In other examples, cloud printing server 200 may perform fleet management of entities 210A-210N, 212, and 214 using distributed ledger 218. In other examples, image forming apparatus 212 may self-monitor to determine cloud services that have access to image forming apparatus 212 using distributed ledger 218.

Figure 2B:
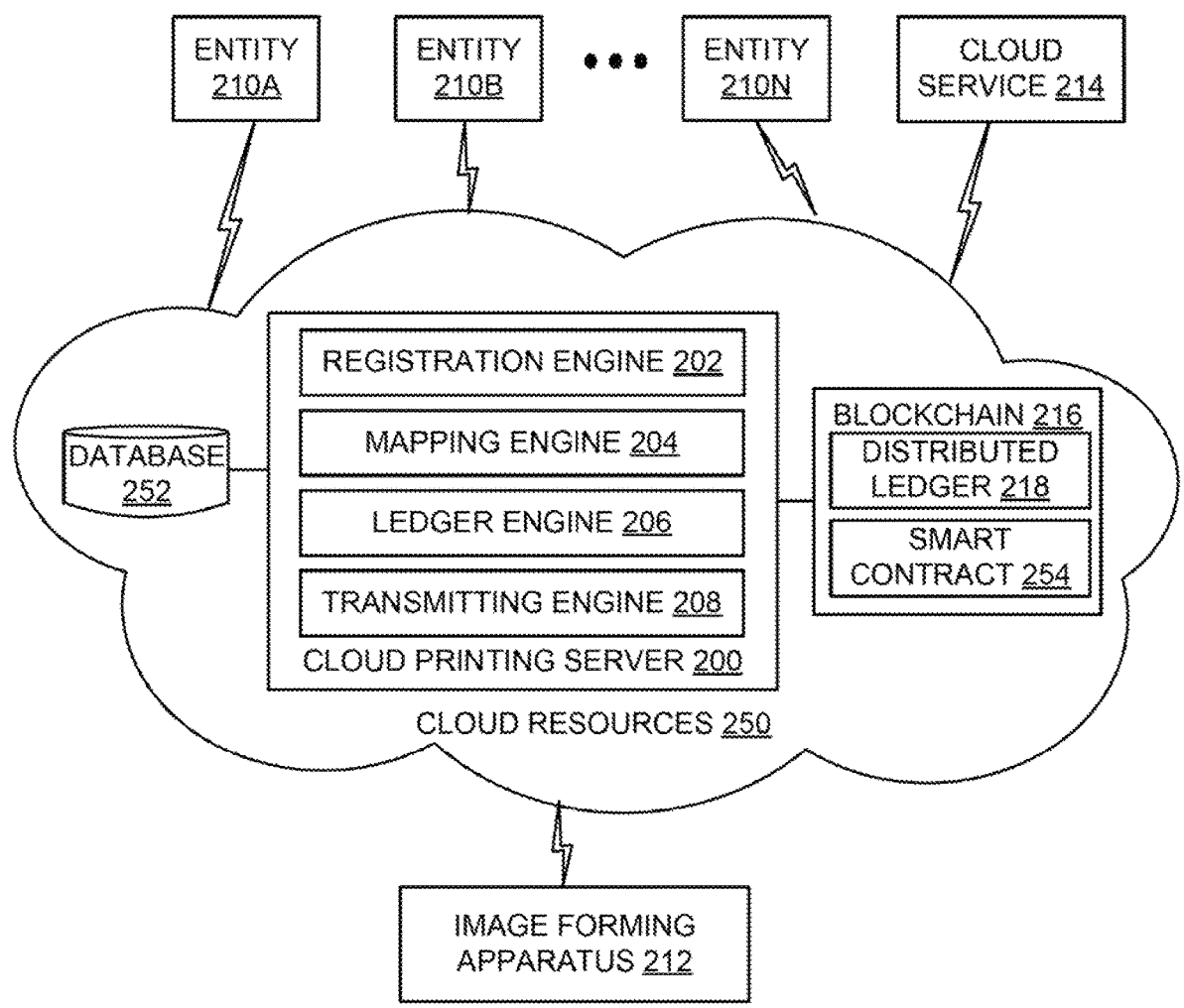
FIG. 2B is a block diagram of the example cloud printing server of FIG. 2A, depicting additional features.

FIG. 2B is a block diagram of example cloud printing server 200 of FIG. 2A, depicting additional features. For example, similarly named elements of FIG. 28 may be similar in structure and/or function to elements described with respect to FIG. 2A. As shown in FIG. 23, cloud printing server 200 may be implemented using cloud resources 250. The term "cloud services" may refer to printing services that are provided using cloud resources 250. For example, image forming apparatus 212 may be registered with cloud printing server 200 and may rely on cloud printing server 200 for cloud services (e.g., cloud service 214) and solutions over the Internet. Image forming apparatus 212 may include a multifunction printer (MFP), an all-in-one (AIO), or any other web-connected image forming apparatus.

As shown in FIG. 2B, blockchain 216 may include smart contract 254. During operation, ledger engine 206 may trigger smart contract 254 within blockchain 216 upon receiving, a record of a data transaction between image forming apparatus 212 and cloud service 214. Further, ledger engine 206 may validate, via smart contract 254, image forming apparatus 212 and cloud service 214. Furthermore, ledger engine 206 may create a ledger entry associated with the record of the data transaction upon successful validation. In one example, the ledger entry reflecting the data transaction between image forming apparatus 212 and cloud service 214 may be accompanied by a set of signatures encrypted with a private key of blockchain 216 (e.g., a blockchain service provider). Ledger engine 206 may process the record when the data transaction is for appropriate inclusion in blockchain 216, such as, by pack in the record with the hash of the previous ledger entry to create a valid blockchain link to create the ledger entry.

In addition, ledger engine 206 may update the distributed ledger associated with multiple entities 210A-210N, 212, and 214 to append the ledger entry associated with the record of the data transaction. In other examples, ledger engine 206 may enable access to cloud service 214 using the distributed ledger and a blockchain verification process.

Further, cloud printing server 200 may include a database 252 to store metadata associated with multiple entities 210A-210N, 212, and 214 of the blockchain network for telemetry metrics and analysis. In one example, metadata may include data selected from a group consisting of a type of each of entities 210A-210N, 212, and 214, a capability of each of entities 210A-210N, 212, and 214, and a scope of a transaction associated with each of entities 210A-210N, 212, and 214.

Thus, a blockchain of entities 210A-218N, 212 and 214 having a corresponding own profile, identity to trust along with smart contracts may be created. The smart contracts may refer to functions that auto trigger on events. When entities 210A-210N, 212 and 214 perform transaction, smart contract 254 may get triggered within blockchain 216. Further, smart contract 254 may validate the trust from an associated identity and update distributed ledger 218 that is shared across entities 210A-210N, 212 and 214.

Since entities 210A-210N, 212 and 214 may be comprised within the blockchain network, trust can be permanently established between the image forming apparatuses (e.g., image forming apparatus 212) and the cloud services (e.g., cloud service 214) and cannot be tampered. On the other hand, each transaction can update the involved entity profile, association, and transaction details as references onto distributed ledger 218. In one example, distributed ledger 218 holding the references can be stored in image forming apparatus 212 and the metadata can be stored in an Ethereum private blockchain (e.g., a database).

Cloud printing server 200 of FIGS. 2A and 2B may include computer-readable storage medium including (e.g., encoded with) instructions executable by a processor to implement functionalities described herein in relation to FIGS. 2A and 2B. In some examples, the functionalities described herein, in relation to instructions to implement functions of components of cloud printing server 200 and any additional instructions described herein in relation to the storage medium, may be implemented as engines or modules including any combination of hardware and programming to implement the functionalities of the modules or engines described herein. The functions of components of cloud printing server 200 may also be implemented by a respective processor. In examples described herein, the processor may include, for example, one processor or multiple processors included in a single device or distributed across multiple devices.

Figure 3A:
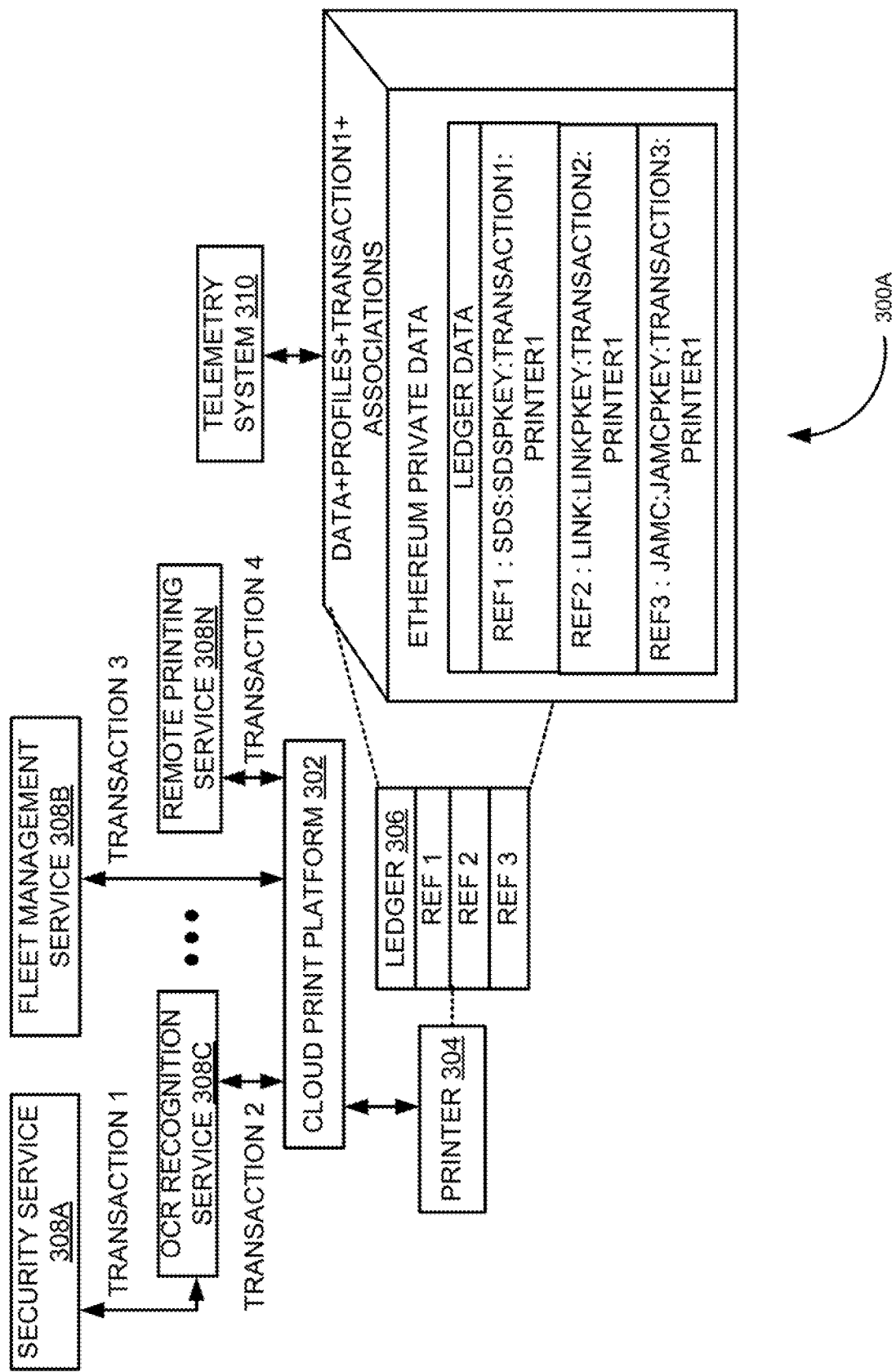
FIG. 3A is a block diagram of an example blockchain architecture, depicting an example distributed ledger in a printer.

FIG. 3A is a block diagram of an example blockchain architecture 300A, depicting an example distributed ledger 306 in a printer 304. Blockchain architecture 300A may include a cloud print platform 302 that can allow users to print from any web-connected device (e.g., a user device). For example, cloud print platform 302 may route a print job between the user device (e.g., a computer, smartphone, tablet, or the like) and send the print job to an Internet-connected printer (e.g., printer 304). Cloud print platform 302 may allow a user to discover printers and print from an own user device.

During operation, printer 304 may be enabled to register with cloud print platform 302. For example, using Ethereum as a blockchain platform provider, a smart contract can be created to register printer 304, during boot up, which can get plugged as a block in a blockchain using the printer details. When printer 304 gets onto the blockchain, a new hash ledger is formed, which can be monitored using a tool (e.g., a tool to run smart contract and monitor the growing ledger). A decentralized application running in the user device may provide an interface for the users to connect to the smart contract. For example, users may log-in into an account using the decentralized application residing in the user device and access associated/subscribed cloud services 308A-308N and printer 304.

In some examples, cloud services 308A-308N may also be registered with cloud print platform 302. Example cloud services 308A-308N may include a security service 308A, a fleet management service 308B, an OCR recognition service 308C, a remote printing service 308N, and the like. Further, user profiles may be associated with printer 304 and subscribed cloud services 308A-308N using the decentralized application that is registered with blockchain architecture 300A.

While a backend of Ethereum may use blockchain as technology, a frontend to create the user profiles and associations to the entities (i.e., printer 304 and cloud services 308A-308N), and corresponding identities with a trust key may be compiled along with a scope defined for transactions. The decentralized application may have a backend code running on a decentralized peer-to-peer network. Further, the decentralized application may have a frontend code and user interfaces written in any language that can make calls to an associated backend. In some examples, the frontend can be hosted on a decentralized storage such as Ethereum's Swarm or InterPlanetary File System (IPFS).

The smart contracts may refer to instructions that runs on the global Ethereum decentralized peer-to-peer network (i.e., decentralized application=frontend+smart contracts), In some example, the decentralized application may be developed using frontend (HTML+CSS+JS) Web page+ backend (solidity smart contract) program+server (e.g., test remote procedure call (RPC)) private blockchain/dummy network in Ethereum platform.

The entity in the print echo systems (i.e., blockchain architecture 300A) may identify associated credibility and associations to continue operational and business functionality. Each entity in blockchain architecture 300A may define profiles along with an associated identity. The blockchain may comprise of such identities (BI) and the relationship of transaction (i.e., SCOPE) with the corresponding entities (BR). Each identity (BI) may have a token exchanged for a specific profile with reference stored on distributed ledger 306. The entities can authorize and authenticate the user based on such records while the blockchain would have the digital key to verify the data to the specific entity and allows access privilege. An entity can request for change in the scope based on the privileges by modifying the entities (BR).

For example, the profile of printer 304 may include a printer serial number, model, and capability list. Further, a user profile may include a name, email ID, phone number, and associated cloud services 308A-308N (e.g., subscribed by the user). The user can either be an administrator with higher privileges to transact with printer 304 or a guest user with limited access or a life-time user. The scope for each user profile may include a communication protocol for onboarding, authenticity credential, user association to printer, and access to cloud services 308A-308N. An example association between user profiles, printers, and cloud services is shown in FIG. 3B.

FIG. 36 is a schematic diagram, depicting example mapping information 3006 between user profiles 352, printers 354, and cloud services 356. In the example shown in FIG. 36, U1-Un may refer to a list of enterprise users, P1-Pn may refer to a list of enterprise printers, and S1-Sn may refer to a list of cloud services.

Figure 3B:
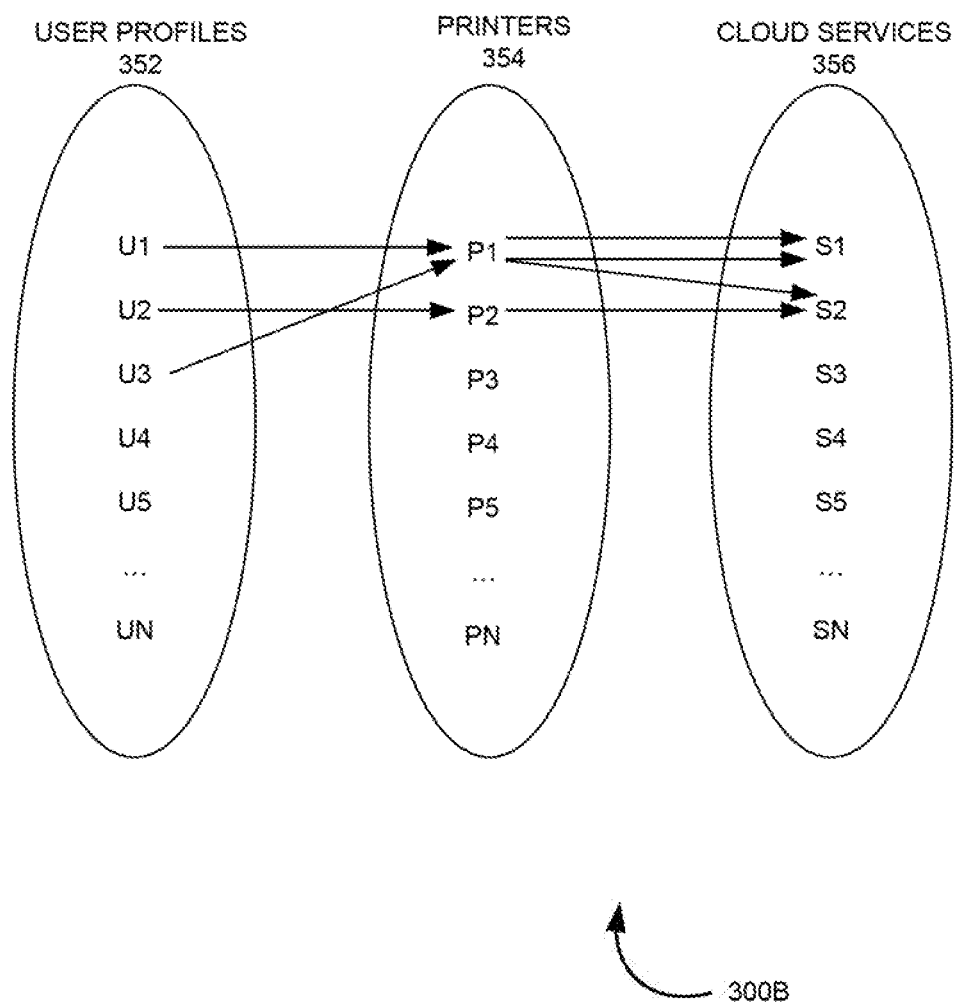
FIG. 3B is a schematic diagram, depicting example mapping information between user profiles, printers, and cloud services.

Further as shown in FIG. 3B, user U1 may be associated with printer P1 and cloud services S1 and S2, user U2 may be associated with printer P2 and cloud service S2, user U3 may be associated with printer P1 and cloud service S1, and the like. The associations between users (i.e., user profiles), printers, and cloud services can be referred to as mapping information 3006.

Referring back to FIG. 3A, when a user associates to printer 304 using the decentralized application that registers to the blockchain, the user details and a unique identifier of printer 304 may get a mapping secret code in a format, for instance, "HPNFC: ID: <<id>> N: <<user name>>". The HPNFC identifier may help cloud print platform 302 in identifying that this tag is meant to be associated to printer 304 for a given user. The tag is written in a specific format which helps printer 304 to launch a smart contract to onboard and register the user profile returning a token that is stored in distributed ledger 306. Printer 304, on other hand, power on register itself with a signed key for which the token for the user generated can be encrypted with. The printer id may be read by the smart contract and generate a key. The printer details and user details can be communicated through a channel to a user application, which is running on the Ethereum blockchain. The cloud print platform 302 may initiate the Ethereum to allow any access to cloud services 308A-308N using the token and corresponding validation. Further, data can be exchanged across cloud services 308A-308N and shared to a telemetry system 310 for metrics collection and data analysis Distributed ledger 306 may be updated with state and configuration information of printer 304 and cloud services 308A-308N at different time intervals (e.g., regular time intervals), the user profile, the mapping information, and data transactions (e.g., transactions 1-4) between printer 304 and cloud services 308A-308N. Thus, examples described herein may minimize complexity within cloud print platform 302 via decentralized architecture 300A that uses the blockchain technology to seamlessly integrate printers to cloud print solutions/cloud services 308A-308N. Examples described herein may maintain decentralized/distributed ledger 306 that records transactions between two parties in a permanent way without needing third-party solutions integrated.

Figure 4A:
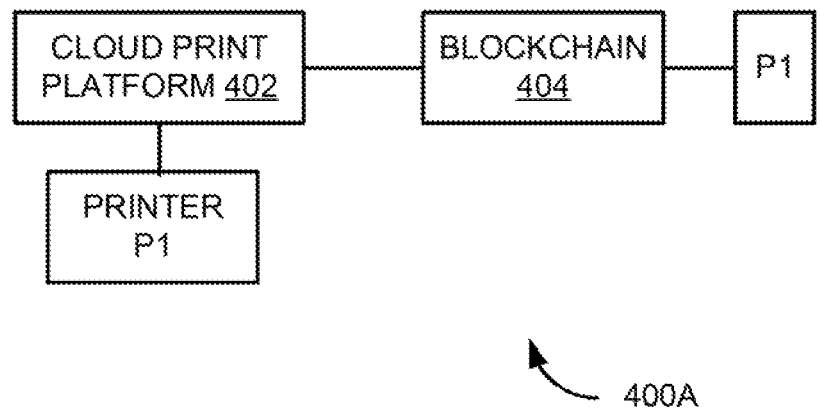
FIGS. 4A-4F illustrate example sequence diagrams, depicting updating a distributed ledger corresponding to a sequence of events associated with a printer and/or a cloud service.

FIGS. 4A-4F illustrate example sequence diagrams 400A-400H, depicting updating a distributed ledger corresponding to a sequence of events associated with a printer and/or a cloud service. FIG. 4A depicts registering a printer P1 with a cloud print platform 402. In this example, printer P1 is added to a blockchain 404 as a block. Further, the distributed ledger may be updated to include information indicating operational state and configuration data of printer P1 at different intervals.

Figure 4B:
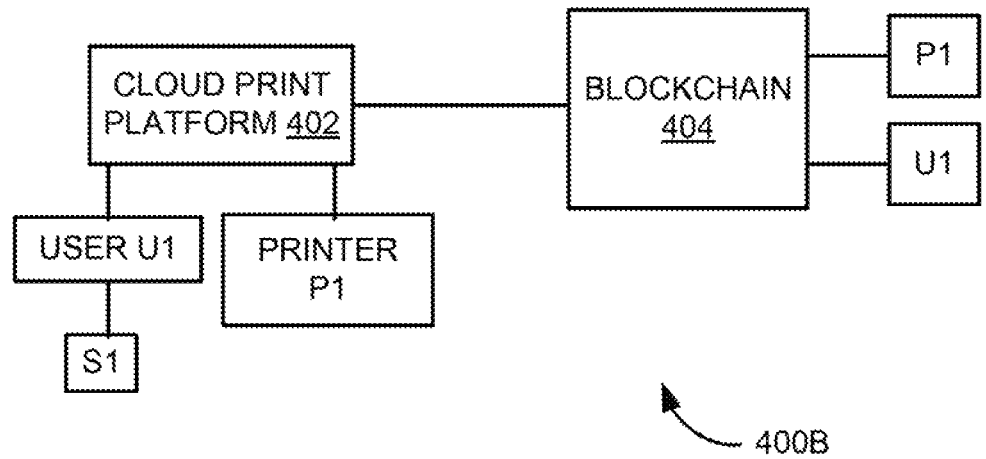

FIG. 4B depicts a user U1 signing into a decentralized application that is registered with cloud print platform 402. In this example, user profile of user U1 may be added to blockchain 404 as a new block. Further, the distributed ledger may be updated to include state and configuration data of user U1. Further, the distributed ledger may be updated to include entitlement information between user U1 and the cloud service S1.

Figure 4C:
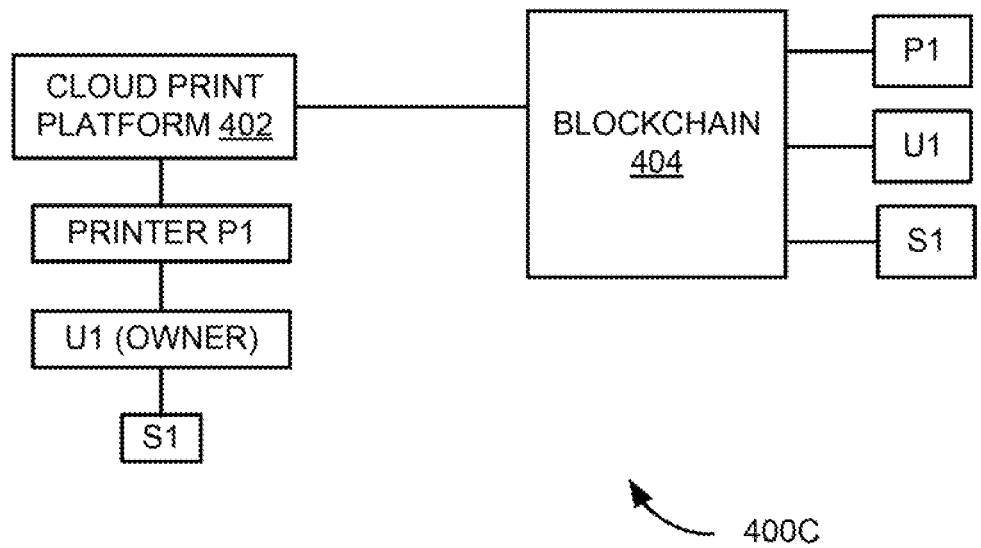

FIG. 4C depicts user U1 claiming printer P1 that is registered with cloud print platform 402. In this example, a cloud service S1 associated with user U1 may be added to blockchain 404 as a new block. Further, the distributed ledger may be updated to include state and configuration data of cloud service S1 at different intervals. Further, the distributed ledger may be updated to include entitlement information between user U1, printer P1, and cloud service S1.

Figure 4D:
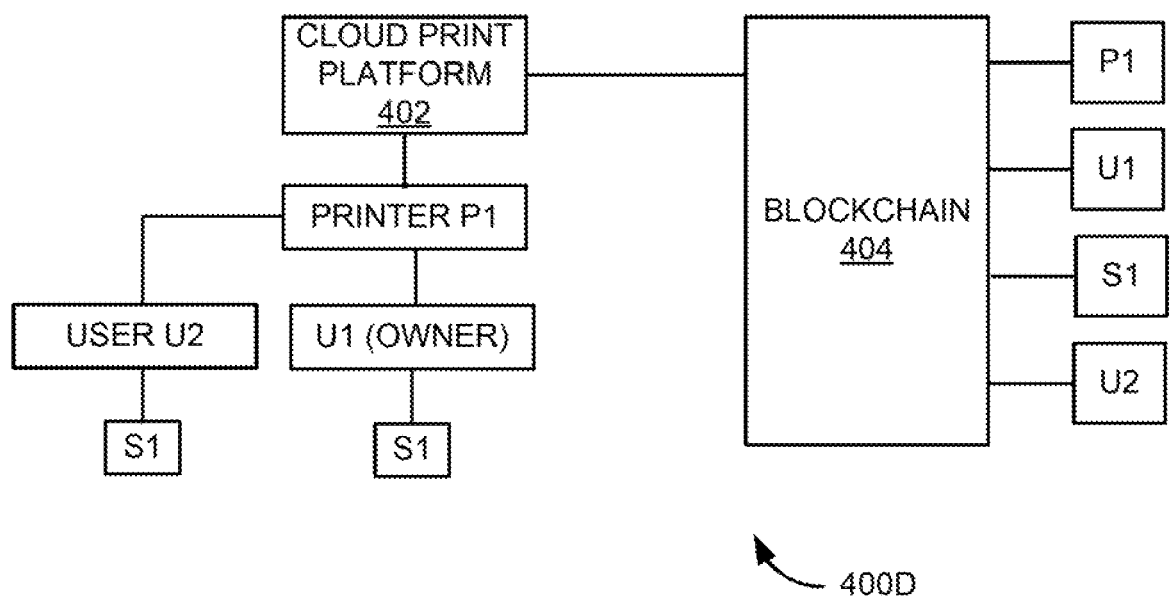

FIG. 4D depicts user U1 sharing printer P1 to a user U2. In other words, user U2 is accessing printer P1 via cloud service S1 upon successful validation. In this example, user U2 may be added to blockchain 404 as a new block. Further, the distributed ledger may be updated to include state and configuration data of user U2 at different intervals. Further, the distributed ledger may be updated to include entitlement information between user U2, printer P1, and cloud service S1.

Figure 4E:
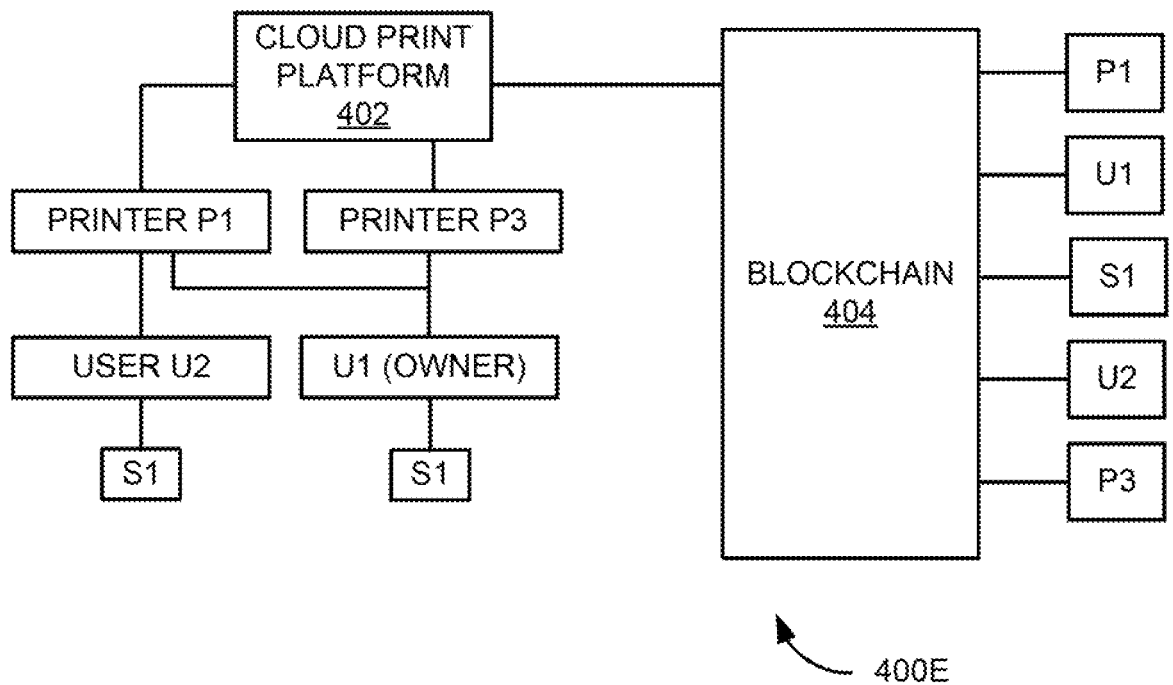

FIG. 4E depicts user U1 claiming printer P3 that is registered with cloud print platform 402. For example, multiple printers may be registered with cloud print platform 402 to receive cloud services and solutions. In this example, printer P3 may be added to blockchain 404 as a new block. Further, the distributed ledger may be updated to include state and configuration data of printer P3 at different intervals. Further, the distributed ledger may be updated to include entitlement information between user U1, printer P3, and cloud service S1.

Figure 4F:
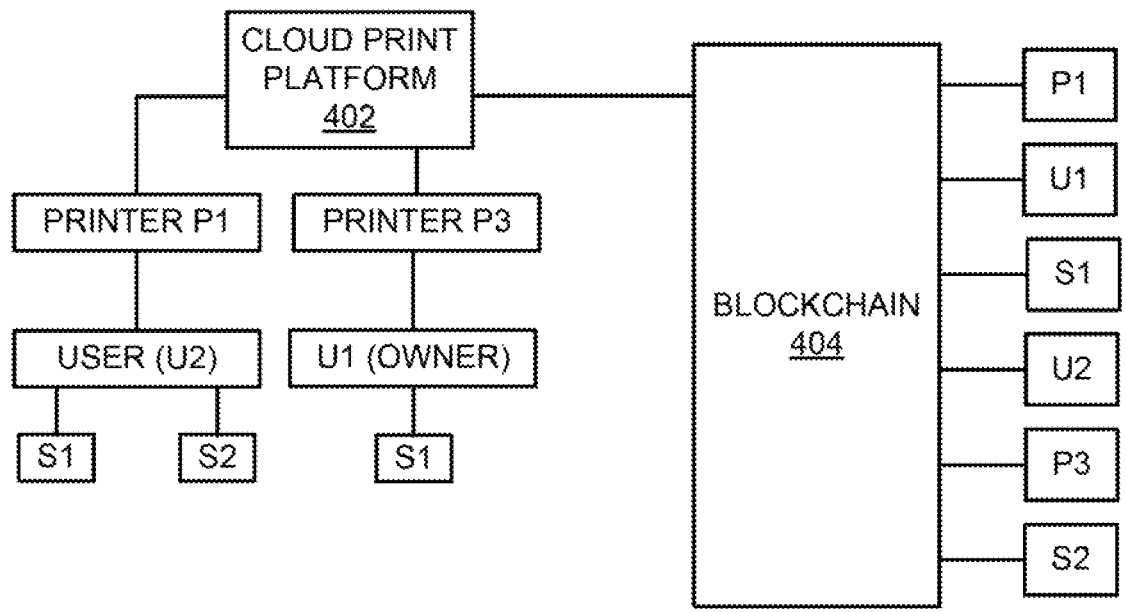

FIG. 4F depicts user U2 associating/subscribing to a cloud service S2. In this example, cloud service S2 associated with user U2 may be added to blockchain 404 as a new block. Further, the distributed ledger may be updated to include state and configuration data of cloud service S2 at different intervals. Further, the distributed ledger may be updated to include entitlement information between user U2, printer P1, and cloud service S2. Thus, the size of blockchain 404 grows with each new entity (e.g., a user, a printer, or a cloud service) or with each new transaction between printer or cloud service. Since blockchain 404 is distributed, there may not be a single point of failure for the information in the blockchain, as compared with, for example, a centralized architecture. In addition, because blockchain 404 is distributed, and because the blocks are linked together in a chain, blockchain 404 can provide a high level of data integrity. Each block may contain transactions and embed a cryptographic hash of a directly preceding block. For instance, the data in an earlier block in the chain cannot be changed without changing the data in the subsequent blocks, as the hash value of the subsequent blocks depends on the contents of earlier blocks.

Figure 5:
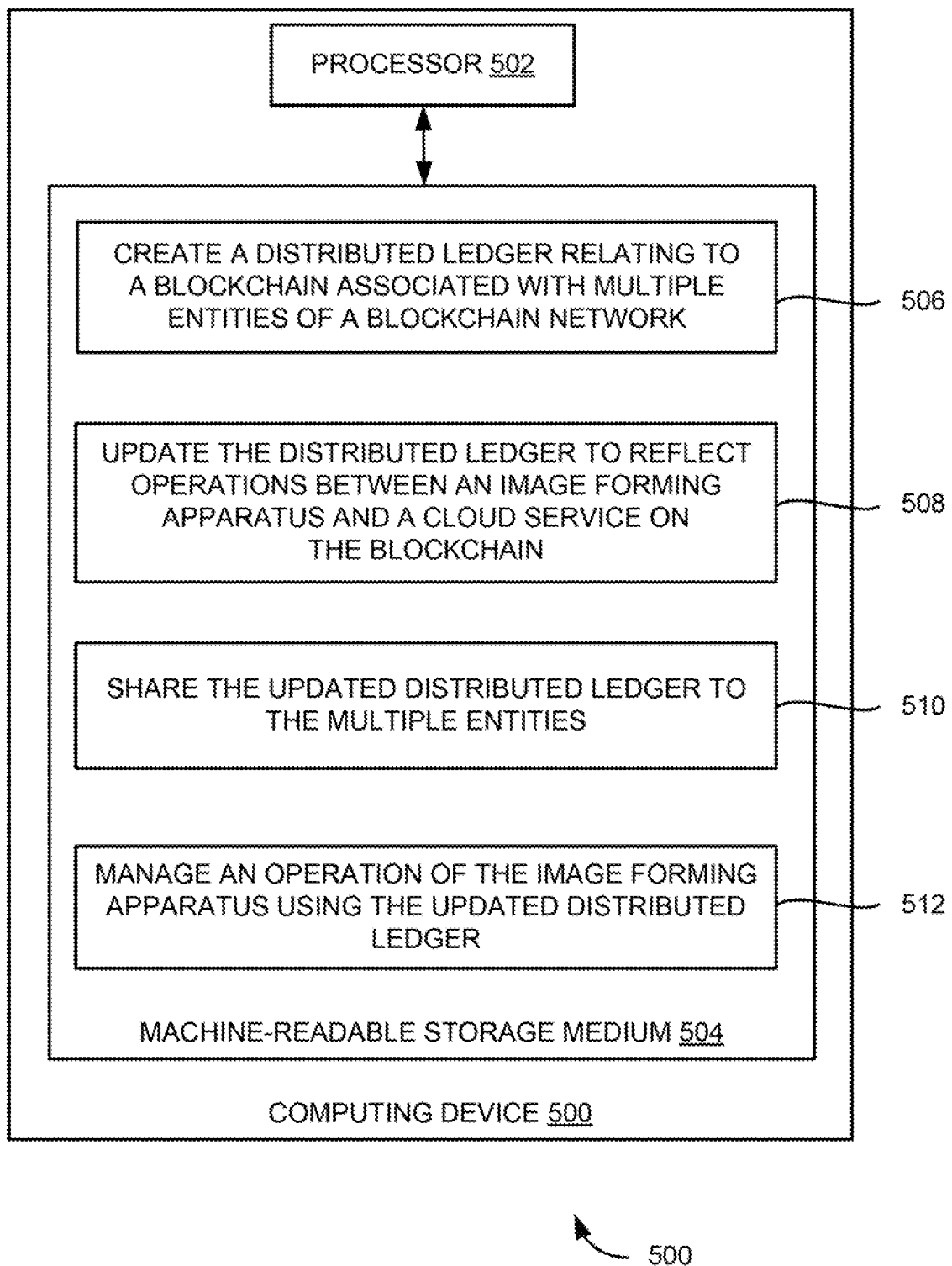
FIG. 5 is a block diagram of an example computing device including a machine-readable storage medium, storing instructions to update and share a distributed ledger to reflect operations between an image forming apparatus and a cloud service in a blockchain.

FIG. 5 is a block diagram of an example computing device 500 including a machine-readable storage medium 504, storing instructions to update and share a distributed ledger to reflect operations between an image forming apparatus and a cloud service in a blockchain. Example computing device 500 may run in a cloud computing environment that implements a blockchain associated with multiple entities of a blockchain network. Example entities may include image forming apparatuses, cloud services, or a combination thereof.

Computing device 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing device 500.

As shown in FIG. 5, machine-readable storage medium 504 may store instructions 506-512. In an example, instructions 506-512 may be executed by processor 502 to maintain the distributed ledger to reflect multiple transactions. Instructions 506 may be executed by processor 502 to create a distributed ledger relating to a blockchain associated with the multiple entities of a blockchain network. Example entities may include an image forming apparatus and a cloud service that are connected via a network.

Instructions 508 may be executed by processor 502 to update the distributed ledger to reflect operations between the image forming apparatus and the cloud service on the blockchain. In one example, instructions to update the distributed ledger to reflect the operations between the image forming apparatus and the cloud service may include instructions to:
1. Trigger a smart contract within the blockchain upon receiving a record of a data transaction between the image forming apparatus and the cloud service,
2. Validate, via the smart contract, the image forming apparatus and the cloud service,
3. Create a ledger entry associated with the record of the data transaction upon successful validation, and
4. Update the distributed ledger associated with the multiple entities to append the ledger entry associated with the record of the data transaction.

For example, the operations between the image forming apparatus and the cloud service on the blockchain may be performed according to an Ethereum protocol. In some examples, instructions to update the distributed ledger to reflect the operations between the image forming apparatus and the cloud service may include instructions to:
1. Establish a trust between the image forming, apparatus and the loud service via a verification process of the blockchain network,
2. Perform the operations between the image forming apparatus and the cloud service on the blockchain upon establishing the trust, and
3. Update the distributed ledger to reflect the operations between the image forming apparatus and the cloud service on the blockchain Instructions 510 may be executed by processor 502 to share the updated distributed ledger to the multiple entities. Instructions 512 may be executed by processor 502 to manage an operation of the image forming apparatus using the updated distributed ledger.

Further, machine-readable storage medium 504 may store instructions to register the image forming apparatus and the cloud service to the blockchain using an associated identifier and an associated signed key prior to updating the distributed ledger to reflect the operations, and update the distributed ledger associated with the multiple entities to reflect state and configuration data of the image forming apparatus and the cloud service.

Further, machine-readable storage medium 504 may store instructions to associate a user profile with the image forming apparatus and the cloud service to generate mapping information, and update the distributed ledger associated with the multiple entities to reflect the mapping information prior to updating the distributed ledger to reflect the operations. In one example, instructions to associate the user profile with the image forming apparatus and the cloud service may include instructions to validate the user profile by the image forming apparatus and the cloud service upon a user associated with the user profile signs into an application associated with the blockchain network via a client device, and associate the user profile with the image forming apparatus and the cloud service upon successful validation.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract, and drawings), and/or all of the steps of any method or process so disclosed, may be combined in any combination, except combinations where some or all of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:
1. A cloud printing server comprising:
   a processor; and
   a memory coupled to the processor, wherein the memory comprises a blockchain management component to
      register an image forming apparatus with a blockchain associated with multiple entities of a blockchain network;
      create a distributed ledger relating to the blockchain;
      create a ledger entry including information indicating operational state and configuration data of the image forming apparatus in the distributed ledger; and
      transmit an instance of the distributed ledger to the multiple entities including the image forming apparatus.
2. The cloud printing server of claim 1, wherein the blockchain management component is to:
   trigger a smart contract within the blockchain upon receiving a record of a data transaction associated with the image forming apparatus;
   validate, via the smart contract, the image forming apparatus;

create a ledger entry associated with the record of the data transaction upon successful validation; and update the distributed ledger associated with the multiple entities to append the ledger entry associated with the record of the data transaction.

3. The cloud printing server of claim 1, wherein the blockchain management component is to create the ledger entry including the information indicating the operational state and configuration data of the image forming apparatus in the distributed ledger via a blockchain verification process.

4. The cloud printing server of claim 1, wherein the blockchain management module is to:

register the image forming apparatus with the blockchain using an identifier and a signed key during powering on of the image forming apparatus.

5. A cloud printing server comprising:

a registration engine to register an image forming apparatus and a cloud service with a blockchain associated with multiple entities of a blockchain network;

a mapping engine to generate mapping information to associate a user profile with the image forming apparatus and the cloud service;

a ledger engine to:

create a distributed ledger relating to the blockchain; and generate a ledger entry corresponding to the image forming apparatus in the distributed ledger based on the mapping information, wherein the ledger entry includes state and configuration information of the image forming apparatus and the cloud service, the user profile, and the mapping information; and a transmitting engine to transmit the distributed ledger to the multiple entities of the blockchain network including the image forming apparatus and the cloud service.

6. The cloud printing server of claim 5, wherein the ledger engine is to:

trigger a smart contract within the blockchain upon receiving a record of a data transaction between the image forming apparatus and the cloud service;

validate, via the smart contract, the image forming apparatus and the cloud service;

create a ledger entry associated with the record of the data transaction upon successful validation; and update the distributed ledger associated with the multiple entities to append the ledger entry associated with the record of the data transaction.

7. The cloud printing server of claim 6, wherein the ledger entry reflecting the data transaction between the image forming apparatus and the cloud service accompanied by a set of signatures encrypted with a private key of the blockchain service provider.

8. The cloud printing server of claim 6, further comprising:

a database to store metadata associated with the multiple entities of the blockchain network for telemetry metrics and analysis, wherein the metadata comprises data selected from a group consisting of a type of each of the entities, a capability of each of the entities, and a scope of a transaction associated with each of the entities.

9. A non-transitory computer-readable storage medium encoded with instructions that, when executed by a computing device in a cloud, cause the computing device to:

create a distributed ledger relating to a blockchain associated with multiple entities of a blockchain network, the entities including an image forming apparatus and a cloud service that are connected via a network;

update the distributed ledger to reflect operations between the image forming apparatus and the cloud service on the blockchain;

share the updated distributed ledger to the multiple entities; and manage an operation of the image forming apparatus using the updated distributed ledger.

10. The non-transitory computer-readable storage medium of claim 9, wherein instructions to update the distributed ledger to reflect the operations between the image forming apparatus and the cloud service comprise instructions to:

trigger a smart contract within the blockchain upon receiving a record of a data transaction between the image forming apparatus and the cloud service;

validate, via the smart contract, the image forming, apparatus, and the cloud service;

create a ledger entry associated with the record of the data transaction upon successful validation; and update the distributed ledger associated with the multiple entities to append the ledger entry associated with the record of the data transaction.

11. The non-transitory computer-readable storage medium of claim 9, further comprising instructions to:

register the image forming apparatus and the cloud service to the blockchain using an associated identifier and an associated signed key prior to updating the distributed ledger to reflect the operations; and update the distributed ledger associated with the multiple entities to reflect state and configuration data of the image forming apparatus and the cloud service.

12. The non-transitory computer-readable storage medium of claim 9, further comprising instructions to:

associate a user profile with the image forming apparatus and the cloud service to generate mapping information; and update the distributed ledger associated with the multiple entities to reflect the mapping information prior to updating the distributed ledger to reflect the operations.

13. The non-transitory computer-readable storage medium of claim 12, wherein instructions to associate the user profile with the image forming apparatus and the cloud service comprises instructions to:

validate the user profile by the image forming apparatus and the cloud service upon a user associated with the user profile signs into an application associated with the blockchain network via a client device; and associate the user profile with the image forming apparatus and the cloud service upon successful validation.

14. The non-transitory computer-readable storage medium of claim 9, wherein the operations between the image forming apparatus and the cloud service on the blockchain are performed according to an Ethereum protocol.

15. The non-transitory computer-readable storage medium of claim 9, wherein instructions to update the distributed ledger to reflect the operations between the image forming apparatus and the cloud service comprise instructions to:

establish a trust between the image forming apparatus and the cloud service via a verification process of the blockchain network;

perform the operations between the image forming apparatus and the cloud service on the blockchain upon establishing the trust; and update the distributed ledger to reflect the operations between the image forming apparatus and the cloud service on the blockchain.

\* \* \* \* \*